US011909257B2

(12) United States Patent
Yu et al.

(10) Patent No.: US 11,909,257 B2
(45) Date of Patent: Feb. 20, 2024

(54) GAIN ADJUSTMENT STAGE FOR CONTROLLING MODULAR UPS SYSTEMS

(71) Applicant: SCHNEIDER ELECTRIC IT CORPORATION, Foxboro, MA (US)

(72) Inventors: Qinghong Yu, Carlisle, MA (US); Adam Daniel Sanner, Nashua, NH (US); Jing Huang, Andover, MA (US); Kaushal J. Patel, Lowell, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 131 days.

(21) Appl. No.: 17/536,915

(22) Filed: Nov. 29, 2021

(65) Prior Publication Data
US 2023/0170733 A1 Jun. 1, 2023

(51) Int. Cl.
*H02J 9/06* (2006.01)
*H02J 3/32* (2006.01)

(52) U.S. Cl.
CPC ............... *H02J 9/062* (2013.01); *H02J 3/32* (2013.01)

(58) Field of Classification Search
CPC .................................. H02J 3/32; H02J 9/062
USPC ........................................................ 307/64, 66
See application file for complete search history.

(56) References Cited

U.S. PATENT DOCUMENTS

| 9,515,520 | B1* | 12/2016 | Kim | H02J 9/062 |
| 2008/0158917 | A1 | 7/2008 | Chen | |
| 2009/0009005 | A1* | 1/2009 | Luo | H02M 7/493 |
| | | | | 307/82 |
| 2014/0239723 | A1* | 8/2014 | Beg | H02J 3/381 |
| | | | | 307/53 |

FOREIGN PATENT DOCUMENTS

AU 2012364268 B2 4/2017

OTHER PUBLICATIONS

Extended European Search Report from corresponding European Application No. 22207436.1 dated Apr. 17, 2023.

* cited by examiner

*Primary Examiner* — Michael R. Fin
(74) *Attorney, Agent, or Firm* — Lando & Anastasi, LLP

(57) ABSTRACT

Uninterruptible power supplies, power modules, and non-transitory computer readable mediums storing instructions for operating such power modules, the power modules comprising an input configured to receive AC power from an AC power source, an output configured to provide AC output power to a load, and a plurality of power modules coupled in parallel between the input and the output, each power module of the plurality of power modules configured to provide at least a portion of the AC output power to the output. Each power module of the plurality of power modules comprises a current compensator stage configured to generate a current error signal based on output current of a corresponding power module and a gain adjustment stage configured to adjust the current error signal based on a measurement of the output current and a desired output current of the corresponding power module.

18 Claims, 6 Drawing Sheets

GAIN ADJUSTMENT STAGE FOR CONTROLLING MODULAR UPS SYSTEMS

FIELD

Embodiments of the present disclosure generally relate to modular uninterruptible power supplies (UPS) with power modules coupled in parallel.

BACKGROUND

The use of power devices, such as Uninterruptible Power Supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's do not provide conditioning of input AC power but do provide backup AC power upon interruption of the primary AC power source. Line interactive UPS's are similar to off-line UPS's in that they switch to battery power when a blackout occurs but also include a voltage regulation mechanism, including but not limited to a multi-tap transformer for regulating the output voltage provided by the UPS.

SUMMARY

At least one embodiment is directed to a power module configured to be coupled to one or more additional power modules in parallel, the power module comprising an input configured to receive AC power from an AC power source, an output configured to provide AC output power to a load, a current compensator stage configured to generate a current error signal based on output current of the power module, and a gain adjustment stage. The gain adjustment stage is configured to adjust the current error signal based on a measurement of the output current and a desired output current of the power module.

At least one embodiment is directed to a non-transitory computer readable medium storing instructions for operating at least one power module of a plurality of power modules coupled in parallel, the instructions when executed cause the at least one power module to perform the acts comprising receiving AC power from an AC power source at an input, providing AC output power to a load at an output, generating a current error signal by a current compensator stage based on output current of the at least one power module, receiving a measurement of output current of the at least one power module, and adjusting the current error signal of the corresponding power module, based on the received measurement and a desired output current of the at least one power module.

At least one embodiment is directed to an uninterruptible power supply comprising an input configured to receive AC power from an AC power source, an output configured to provide AC output power to a load, and a plurality of power modules coupled in parallel between the input and the output, each power module of the plurality of power modules configured to provide at least a portion of the AC output power to the output. Each power module of the plurality of power modules comprises a current compensator stage configured to generate a current error signal based on output current of a corresponding power module and a gain adjustment stage configured to adjust the current error signal based on a measurement of the output current and a desired output current of the corresponding power module.

In one example, in adjusting the current error signal the gain adjustment stage is further configured to increase the current error signal in the corresponding power module to increase the output current of the corresponding power module.

In another example, in adjusting the current error signal the gain adjustment stage is further configured to decrease the current error signal in the corresponding power module to decrease the output current of the corresponding power module.

In one example, the gain adjustment stage is further configured to adjust the current error signal of the corresponding power module by providing an adjusted signal to an input of the current compensator stage of the at least one of the plurality of power modules.

In another example, the gain adjustment stage is further configured to receive a current reference signal and adjust a gain of the received current reference signal based on the measurement to generate a gain adjusted current reference signal, the gain adjusted current reference signal being the adjusted signal.

In one example, the current compensator stage of the at least one of the plurality of power modules includes an operational amplifier, and the input of the current compensator stage of the at least one of the plurality of power modules has a negative input of the operational amplifier, the negative input configured to receive the gain adjusted current reference signal.

In another example, the uninterruptible power supply further comprises a central control module configured to generate the current reference signal based on an output voltage at the output and provide the current reference signal to the current compensator stage.

In one example, the uninterruptible power supply further comprises at least one outer voltage control loop including the central control module and a signal path between the central control module, the gain adjustment stage, the current compensator stage, and the output.

In another example, the gain adjustment stage is further configured to adjust a gain of a negative feedback signal to generate a gain adjusted negative feedback signal, the gain adjusted negative feedback signal being the adjusted signal.

In one example, the current compensator stage of the at least one of the plurality of power modules includes an operational amplifier, and the input of the current compensator stage of the at least one of the plurality of power modules has a negative input of the operational amplifier, the negative input of the operational amplifier configured to receive the gain adjusted feedback signal through a resistor.

In another example, the uninterruptible power supply further comprises a central control module configured to generate a current reference signal based on an output voltage at the output and provide the current reference signal to the negative input of the operational amplifier through the resistor.

In one example, the gain adjustment stage comprises a resistor divider.

In another example, the resistor divider is a single bit digitally controlled divider.

In one example, the gain adjustment stage of the at least one of the plurality of power modules is further configured to operate the resistor divider with a pulse width modulation control signal.

In another example, the gain adjustment stage is further configured to adjust a duty cycle of the pulse width modulation control signal to achieve a desired average gain of the gain adjustment stage.

In one example, each power module of the plurality of power modules further comprises a sensor configured to monitor output current of the corresponding power module and provide a feedback signal based on the monitored output current to the gain adjustment stage, the feedback signal having the opposite polarity to a current reference signal.

In another example, the gain adjustment stage is configured to receive a command from a microcontroller in the corresponding power module, the command based on the measurement of the output current and the desired output current of the corresponding power module.

In one example, the output current of the corresponding power module is output current of an inverter in the corresponding power module, the corresponding power module including a current sensor configured to sense the output current from the inverter.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
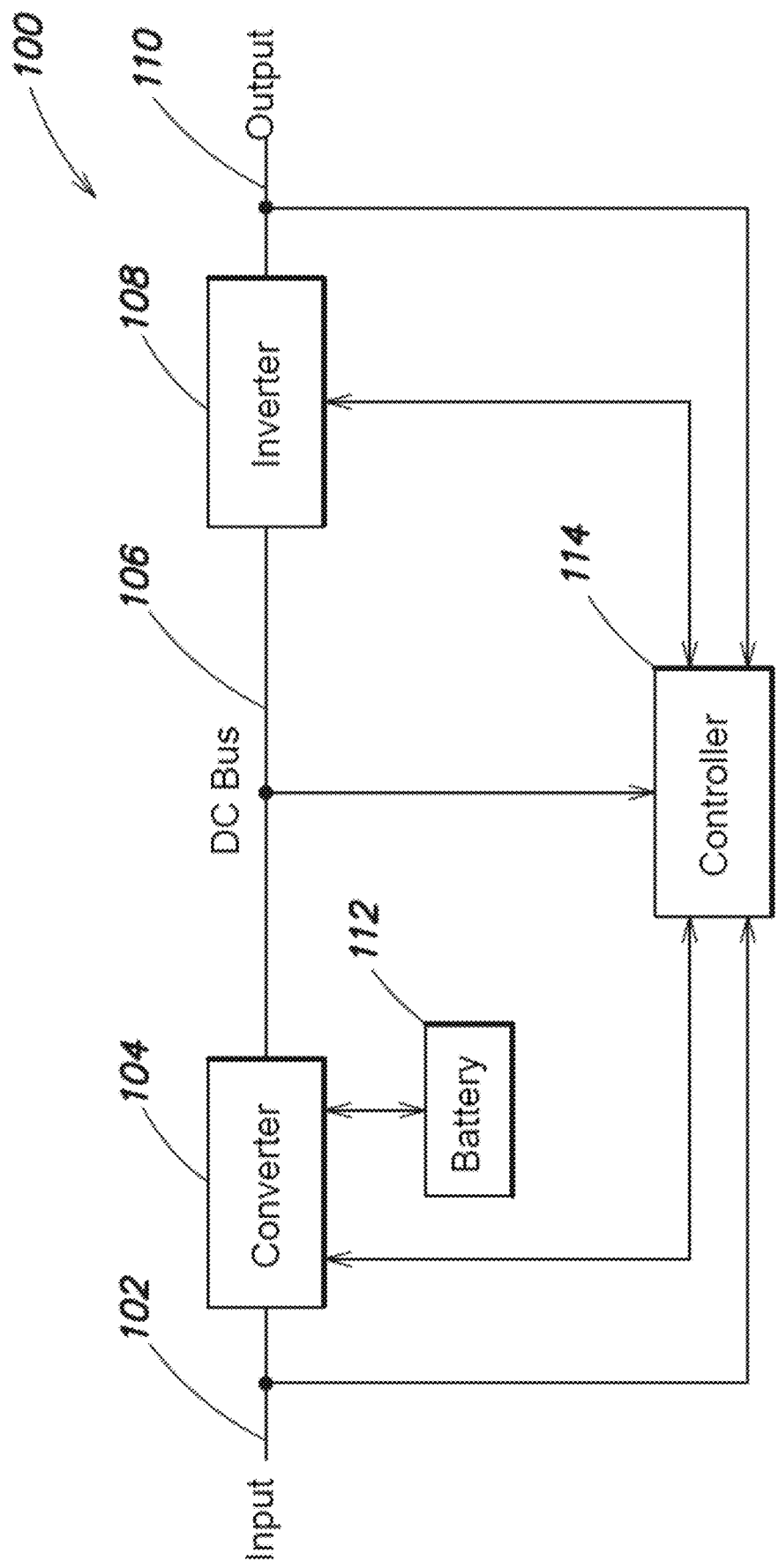
FIG. 1 illustrates a functional block diagram of an uninterruptible power supply (UPS) according to aspects described herein.

It is to be appreciated that embodiments of the methods, systems, and computer readable mediums discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. As used herein, the term "plurality" refers to two or more items or components. The terms "comprising," "including," and "containing," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. References to "or" may be construed as inclusive so that any terms described using "or" may indicate any of a single, more than one, and all of the described terms.

Modular UPS architectures place multiple power modules in parallel to supply power to a load. Each of the power modules typically has its own power circuitry for converting battery DC power into AC output power and/or conditioning input AC power into AC output power. Modular UPS architectures can offer several advantages over standard UPS architectures. For example, when additional power capacity is needed (e.g., because of an increase in load demand), additional power modules can be added to the system to meet the need. In some architectures, the individual power modules are hot swappable, thereby further reducing downtime in upgrading overall capacity.

To control the output of each power module, it is typical to generate a single control signal, based on the output voltage provided by the plurality of power modules to the load, and provide the single control signal to each one of the plurality of power modules. This single control signal provides the same information to each power module to either increase or decrease its respective output current. However, using the same single control signal for multiple power modules may cause some modules to output more current than necessary and overheat, operate in an inefficient manner, and/or supply more current than an internal battery can handle given its state of charge, as the single control signal is not specifically configured for any one of the modules. Accordingly, a system is described herein that improves the degree of control over individual UPSs in a modular UPS system, thereby improving the efficiency of the modular UPS system, and preventing damage to components within the modular UPS system or to the load.

FIG. 1 is a block diagram of one embodiment of an on-line UPS 100 that can provide regulated power from input AC power received at an input 102, as well as back-up DC power from a backup power source 112 (e.g., a battery), to an output 110. The UPS 100 can be configured to provide output AC power that is voltage and frequency independent from the input AC power. In some examples, the backup power source 112 may be included in the UPS 100; however, in other examples, the backup power source 112 may be external to the UPS 100. The UPS 100 includes a converter 104, a DC bus 106, an inverter 108, and a controller 114 for controlling the converter 104 and the inverter 108. The DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power quality threshold), the controller 114 operates the UPS 100 in an online mode of operation.

In the online mode of operation, AC power from the input 102 is provided to the converter 104. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a separate DC/DC converter (e.g., a charger). The controller 114 operates the inverter 108 to convert the DC power into regulated AC power and provide the regulated AC power to a load coupled to the output 110.

When AC power provided to the input 102 is not acceptable (i.e., below an input power quality threshold), the controller 114 operates the UPS 100 in a backup mode of operation. In the backup mode of operation, DC power from the backup power source 112 is provided to the DC bus 106. The inverter 108 receives the DC power from the DC bus 106, and the controller 114 operates the inverter 108 to convert the DC power from the DC bus 106 into regulated AC power and provide the regulated AC power to the output 110.

Figure 2:
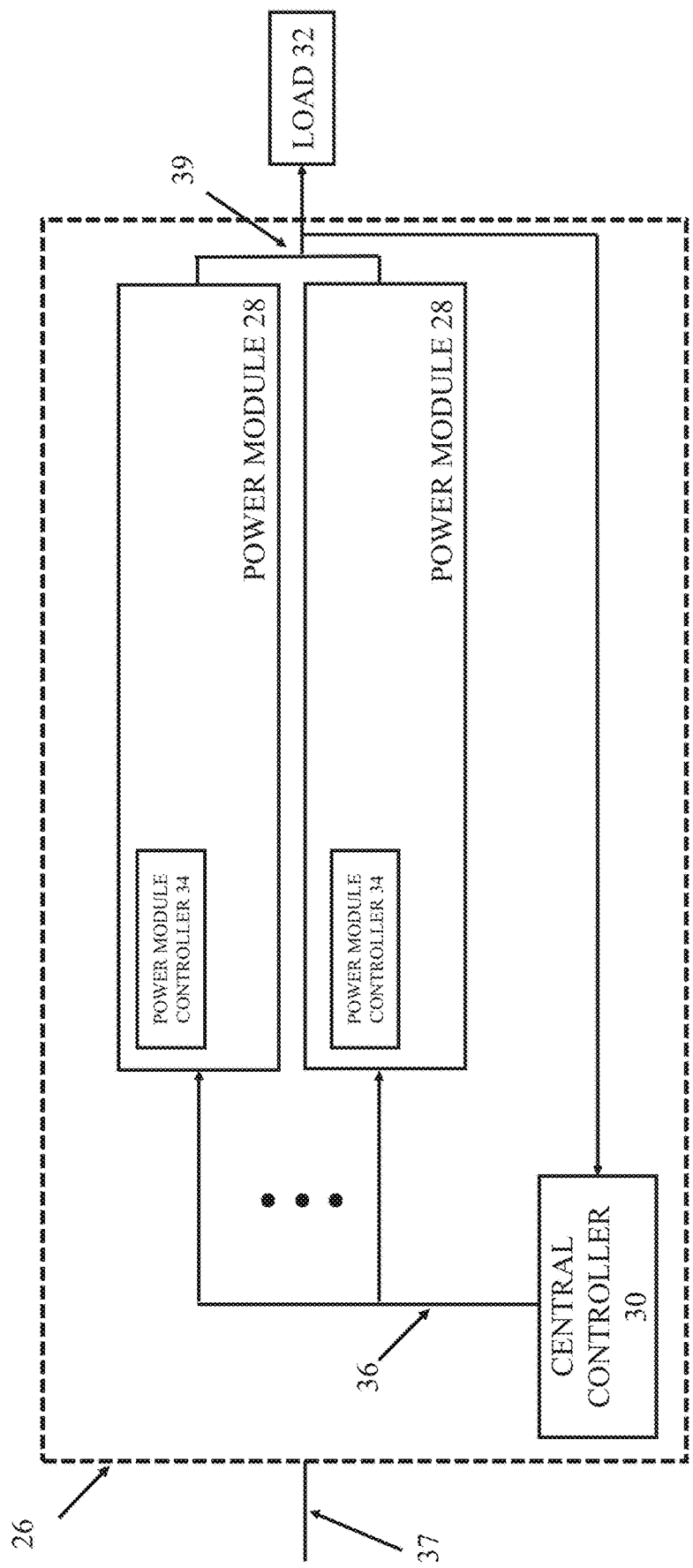
FIG. 2 is a functional block diagram of a modular UPS according to aspects described herein.

FIG. 2 is a functional block diagram of a modular UPS system 26 that includes a central controller 30, a load 32, and a plurality of power modules 28 coupled in parallel between the central controller 30 and the load 32. In certain embodiments, each power module 28 includes a separate UPS (e.g., an off-line UPS, an on-line UPS such as the on-line UPS 100, or a line-interactive UPS). The modular UPS system 26 includes an input 37 that is configured to receive input AC power. The AC power received at the input 37 includes any of single phase and three phase AC power.

The input 37 is configured to provide the received input AC power to each of the power modules 28. Each of the power modules 28 includes a power module controller 34 (e.g., such as the UPS controller 114 of FIG. 1) that operates the UPS of each power module 28 to provide output AC power derived from the input AC power and/or backup DC power from a backup power source (e.g., a battery), as similarly discussed above with respect to FIG. 1. In some examples, each power module 28 includes its own battery. In other examples, one or more of the power modules 28 are configured to share the same battery in the modular UPS system 26. In some examples, each one of the power modules 28 is connected to the same battery. In some examples, two or more power modules 28 can share other UPS components such as, for example, the PFC converter front end or DC bus.

The plurality of power modules 28 is coupled to the central controller 30 and is also coupled in parallel between the input 37 and the output 39. The output 39 is configured to provide the output AC power to the load 32. In at least one embodiment, the power module controller 34 includes a microcontroller. To modify the level of current being provided by the plurality of power modules 28 to the load 32, the central controller 30 monitors the output voltage of the modular UPS system 26 and outputs a current reference signal 36 to each of the plurality of power modules 28 based on the output voltage of the modular UPS system 26. The current reference signal 36 is generated to control the output current of each power module 28. The output current of each power module 28 may be increased or decreased depending on the output voltage of the modular UPS system 26 and a desired output power level of the modular UPS system 26 identified by the central controller 30. Responsive to receiving the current reference signal 36, each power module 28 adjusts its output current accordingly.

A potential problem with each power module 28 receiving the same current reference signal 36 and performing the same adjustments to their respective output currents can be that this approach does not account for the unique differences between the power modules 28. For example, one of the power modules 28 may be operating at its thermal limit and not suitable to provide a requisite amount of power to the load 32 relative to the other power modules 28. The central controller 30, after determining that the load 32 is receiving an inadequate amount of power, would issue the same current reference signal 36 to each of the power modules 28 to increase their respective inverter outputs to bring the total power provided to the load 32 back to a desired level. However, increasing the inverter output of each power module 28 has several potential drawbacks. For the power module 28 that is running at its thermal limit, or otherwise operating inefficiently, increasing its inverter output may cause damage to internal components of the power module 28 due to overheating or components exceeding their rated tolerances.

Using the same current reference signal 36 for each of the power modules 28 can have other drawbacks, including causing sensor error and variations in individual power modules 28 that cannot be corrected by an outer voltage control loop. Such errors and variations present as unbalanced power sharing among power modules 28. The power sharing problem can cause an overload and overheating of individual power modules, which can result in more design margin, risk, cost, and size. The power sharing problem can also cause power modules 28 to transfer to battery mode at different line conditions, thereby causing confusion where some modules operate on-line and some operate on battery. To exacerbate these problems, typical fast current sensors used to monitor inverter output are not optimized for accuracy.

Embodiments described herein provide a gain adjustment stage that can allow power modules coupled in parallel to implement appropriate power sharing while avoiding overload and overheating conditions. In some examples, the gain adjustment stage is included in the power module controller 34. The gain adjustment stage allows individual power modules to individually adjust their own output level based on their own individual operating conditions. This gain adjustment stage 42, in certain examples, allows the central controller 30 to assign different power modules 28 to operate at different power levels as desired through a general-purpose digital communication path (e.g., RS485), while still sending the same current reference signal 36 to the power modules 28. With the gain adjustment stage dynamic power level adjustment or control can be fast and seamless. The gain adjustment stage 42 effectively acts as a disturbance in a closed loop control system, which rebalances itself to a new adjusted power level in response to the disturbance created by the gain adjustment stage.

Figure 3A:
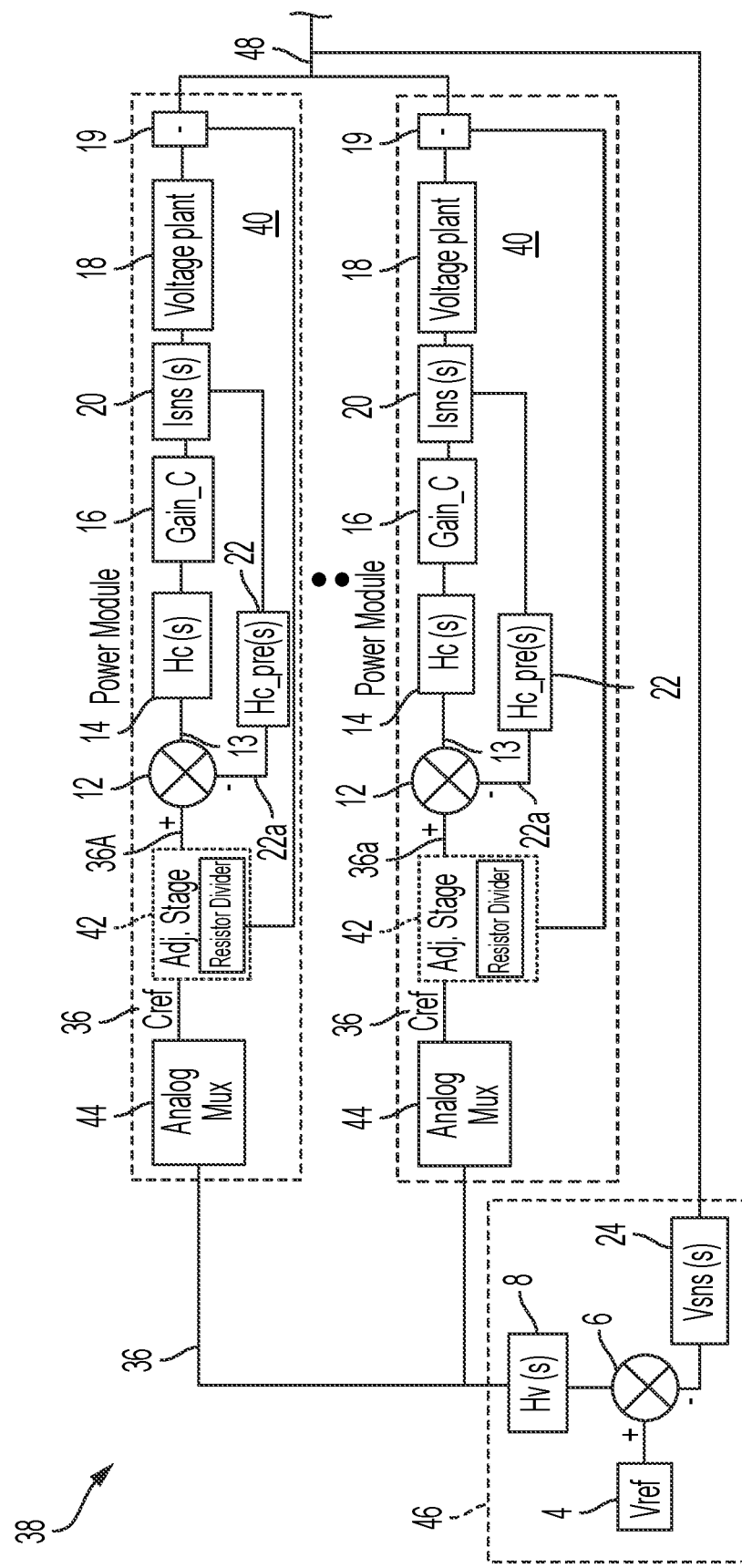
FIG. 3A is a functional block diagram of a modular UPS according to aspects described herein.

FIG. 3A is a functional block diagram of one example of a modular UPS system 38. The modular UPS system 38 includes a plurality of power modules 40. In certain examples, each power module 40 corresponds to the power module 28 shown in FIG. 2. Each power module 40 includes an analog multiplexer 44 and a gain adjustment stage 42. The analog multiplexer 44 receives the current reference signal 36 and provides the current reference signal 36 to the gain adjustment stage 42.

The modular UPS system 38 implements a UPS current mode control scheme that includes a reference voltage 4, a first summer 6, a voltage compensator stage 8, a current reference signal 36, a second summer 12, a current error signal 13, a current compensator stage 14, a current gain stage 16, a voltage plant 18, a first current sensing stage 19, a second current sensing stage 20, a negative feedback stage 22, and a voltage sensing stage 24. In some embodiments, the first current sensing stage 19 is a current sensor (e.g., current transformer or Hall effect sensor). In some embodiments, the second current sensing stage 20 is a current sensor (e.g., current transformer or Hall effect sensor).

The UPS current mode control scheme of each power module 28 is implemented in at least one embodiment by the power module controller 34. In at least one other embodiment, the UPS current mode control scheme is implemented by the central controller 30. The UPS current mode control scheme is also implemented, in at least one embodiment, by a combination of the central controller 30 and the power module controller 34. Embodiments include one or both of the power module controller 34 and the central controller 30 being microcontrollers.

Within the control scheme is an inverter current control loop formed by the second summer 12, the current compensator stage 14, the current gain stage 16, the second current sensing stage 20, and the negative feedback stage 22. The current loop regulates the output current of an inverter (e.g., the inverter 108 shown in FIG. 1) included in each power module 40 to follow a gain adjusted current reference signal 36a (discussed in more detail below).

To produce the current reference signal 36 for the current control loop, the first summer 6 receives the reference voltage 4 at its positive input and an output voltage value from the voltage sensing stage 24 at its negative input. The difference between these two voltages is provided to the voltage compensator stage 8, which outputs the current reference signal 36.

As part of the current control loop, the gain adjustment stage 42 is configured to receive one or more output parameters to adjust the gain of the current reference signal 36 and thereby produce the gain adjusted current reference signal 36a. In at least one embodiment, the gain adjustment stage 42 adjusts the gain of the current reference signal 36 based on output parameters of the corresponding power module 40. In an example, one of the one or more output parameters is output current provided at the output of the voltage plant 18. In one embodiment, the output current is sensed by the first current sensing stage 19 located at the output of the voltage plant 18.

As part of the current control loop, in some examples, the inverter inductor current sensed by the second current sensing stage 20 is then provided to the negative feedback stage 22 to generate the feedback signal 22a. The feedback signal 22a is provided to the negative input of the second summer 12. The second summer 12 takes at its positive input, the gain adjusted current reference signal 36a provided by the gain adjustment stage 42, and at its negative input, the feedback signal 22a. The difference between the gain adjusted current reference signal 36a and the feedback signal 22a is provided by the second summer 12 as the current error signal 13 to the current compensator stage 14, which provides an output to the current gain stage 16. The output of the current gain stage 16 is the inverter inductor current, which is sensed by the second current sensing stage 20 and conducts to the voltage plant 18.

FIG. 3A shows the relationship between the current control loop described above and an outer voltage control loop. Each power module 40 has an output connected to the output 48 in parallel and the output voltage is sensed by a central controller 46. The central controller 46 includes the voltage compensator stage 8, the reference voltage 4, the voltage sensing stage 24, and the first summer 6. The outer voltage loop includes a signal path between the central controller 46, the gain adjustment stage 42, and the output 48. The current control loop and the outer voltage loop overlap in the signal path at the second summer 12, the current error signal 13, the current compensator stage 14 and the current gain stage 16. The outer voltage loop is implemented by the central controller 46 to monitor output voltage at the output 48 of the system 38 and generate the current reference signal 36 based on the monitored output voltage. The current reference signal 36 is then received by the gain adjustment stage 42 to adjust the gain of the current error signal 13, thereby adjusting the output of the power module 40.

The gain adjustment stage 42, shown in FIG. 3A, is coupled to the first current sensing stage 19 and a node that is located between the current reference signal 36 and the positive input of the second summer 12. The analog multiplexer 44 is configured to receive the current reference signal 36 from the outer voltage loop and provide the current reference signal 36 to the gain adjustment stage 42. Accordingly, the outer voltage loop and the current control loop overlap in the signal path that includes, in order, the gain adjustment stage 42, the second summer 12, the current compensator stage 14, the current gain stage 16, and the voltage plant 18.

In at least one embodiment, the gain adjustment stage 42 placed in the configuration of the modular UPS system 38 of FIG. 3A adjusts its gain based on information about output current sensed at the output of the voltage plant 18. In an example, the output current provided by the voltage plant 18 is obtained by the first current sensing stage 19, which is coupled to the output of the voltage plant 18. In one example, the first current sensing stage 19 is a line frequency current transformer that reports its output to the controller of the power module (e.g., a microcontroller in the power module 40). Based on the one or more output parameters, the gain adjustment stage 42 is instructed by the controller located in the power module (e.g., the power module 40) to increase or decrease the gain of the current error signal 13 by correspondingly increasing or decreasing the difference calculated by the second summer 12 between the gain adjusted current reference signal 36a and the feedback signal 22a, thereby increasing or decreasing the gain of the current error signal 13. In some examples, this gain adjustment can be coordinated by the microcontroller located in central controller 46 through digital communication path.

By adjusting the gain of the current reference signal 36 and providing the adjusted current reference signal 36a as a gain-adjusted version of the current reference signal 36, the gain adjustment stage 42 adjusts the current reference signal 36 provided to the second summer 12 by altering the signal being provided to the positive input of the second summer 12, which also receives the feedback signal 22a at the negative input of the second summer 12. Thus, the second summer 12 produces the current error signal 13 as the difference between the signals received at its two inputs, which in turn adjusts the gain of the signal received by the current compensator stage 14, which thereby adjusts the output of the power module 40.

Each of the power modules 40 is coupled in parallel between the voltage compensator stage 8 and the output 48. The output 48 is coupled to a load. The central controller 46 provides the current reference signal 36 to each analog multiplexer 44 of each power module 40. Accordingly, each power module 40 receives the same instruction from the central controller 46.

In some examples, the power modules 40 include a controller therein, separate from the central controller 46, which includes the gain adjustment stage 42. Unlike previous power modules, which rely only on the same current reference signal as all the other power modules coupled in parallel to adjust its output current, each power module 40 performs its own output current amplitude adjustment, unique to the specific output of the individual power module 40. Accordingly, the benefit of improving overall UPS sharing, protection, and/or optimization can be achieved at least in part, due to the local processing performed by the controller of each power module 40.

The gain adjustment stage 42, in certain embodiments, is configured to adjust the gain of the current reference signal 36, as discussed above. In other embodiments, the gain adjustment stage 42 is configured to adjust the gain of the feedback signal provided by the negative feedback stage 22. In either scenario, the gain adjustment stage 42 effectively adjusts the current error signal 13 produced by the second summer 12 by either increasing or decreasing the current error signal 13.

Figure 3B:
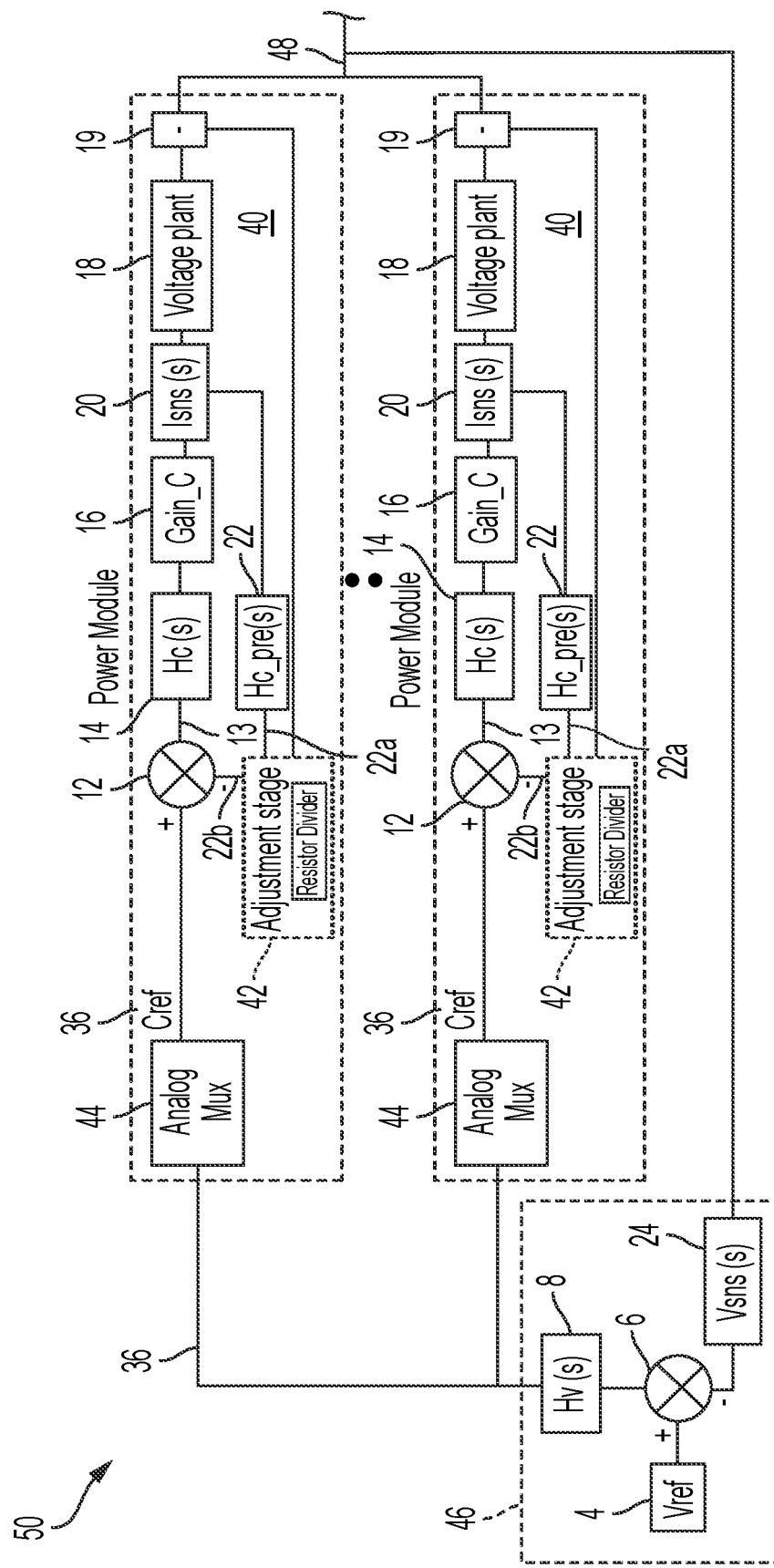
FIG. 3B is a functional block diagram of a modular UPS according to aspects described herein.

FIG. 3B is a functional block diagram of a modular UPS system 50. The modular UPS system 50 includes components in common with the modular UPS system 26 and the modular UPS system 38, differing at least by the placement of the gain adjustment stage 42. Instead of being placed between the current reference signal 36 and the positive input of the second summer 12, the gain adjustment stage 42 of the modular UPS system 50 is placed between the negative feedback stage 22 and the negative input of the second summer 12. This placement of the gain adjustment stage 42 adjusts a gain of the feedback signal 22a from the negative feedback stage 22 to thereby generate a gain adjusted feedback signal 22b, which is provided to the negative input of the second summer 12 to then be combined with the current referent signal 36 by the second summer 12 to produce the gain-adjusted current error signal 13 as the output of the second summer 12.

In at least one embodiment, the gain adjustment stage 42 placed in the configuration of the modular UPS system 50 of FIG. 3B adjusts its gain based on information about the output current sensed by the first current sensing stage 19 located at the output the voltage plant 18. In an example, the output current provided by the voltage plant 18 is obtained by a current transformer coupled to the output of the voltage plant 18. In one example, the current transformer is a line frequency current transformer that reports its output to the microcontroller of the power module 40. The second current sensing stage 20, in some examples, is a fast response Hall sensor. Based on the one or more output parameters, the gain adjustment stage 42 is instructed by a controller to increase or decrease the gain of the inverter current feedback signal 22a to generate the gain adjusted feedback signal 22b, thereby increasing or decreasing the gain of the feedback path.

As shown in FIGS. 3A and 3B, the gain adjustment stage 42 causes an increase or decrease in the current error signal 13 or inverter current feedback path. In some examples, this increase or decrease is responsive to receiving a command from the microcontroller in the power module 40 based on the desired output current and one or more output parameters of the corresponding module. Such output parameters include output current of the voltage plant 18 that is sensed by the second current sensing stage 19.

Figure 4A:
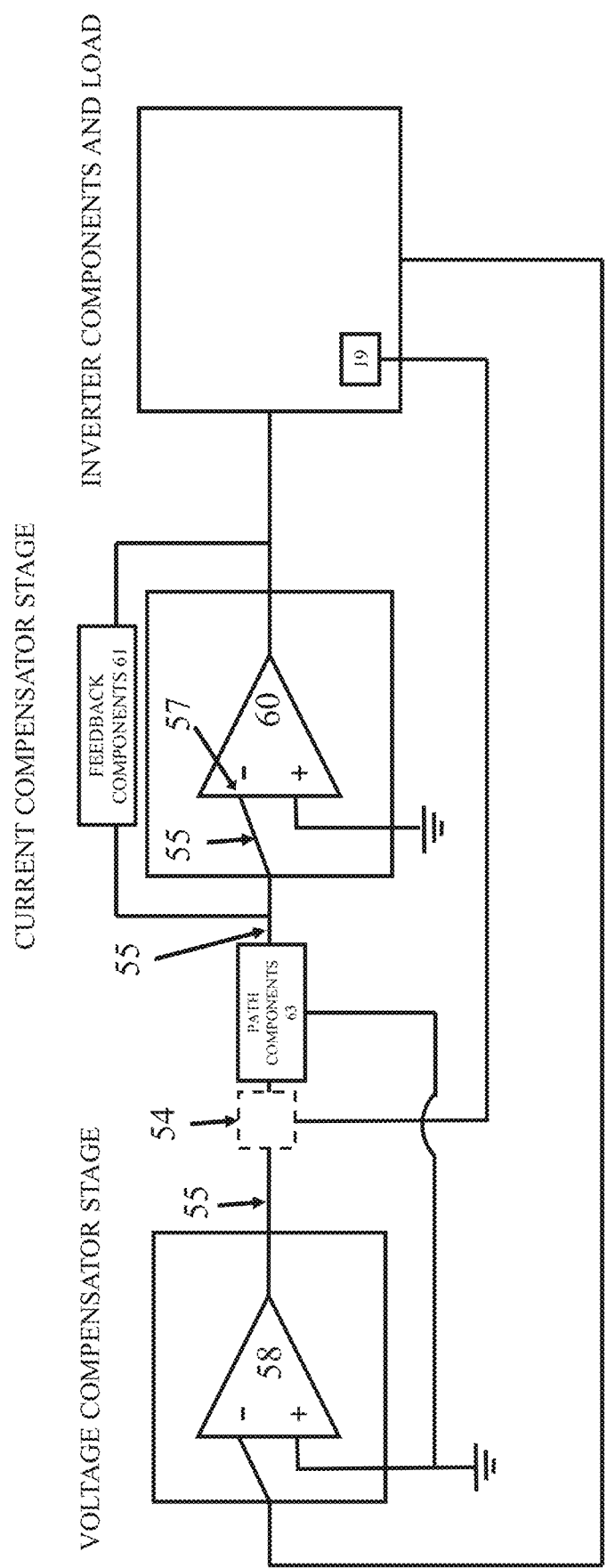
FIG. 4A is a functional block diagram of a circuit including a gain adjustment stage according to aspects described herein.
Figure 4B:
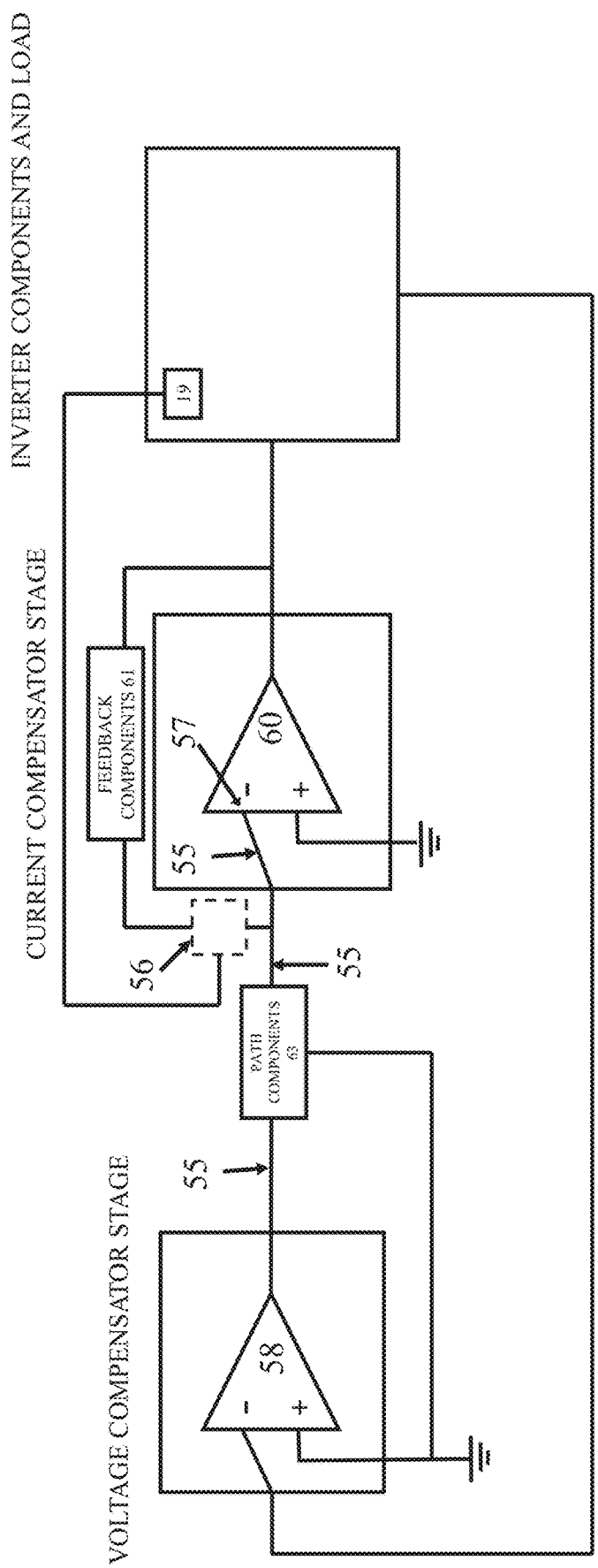
FIG. 4B is a functional block diagram of a circuit including a gain adjustment stage according to aspects described herein.

In an exemplary application of the gain adjustment stage 42, there is provided a circuit for hysteretic current mode control in the inverter of a UPS. This circuit is represented by functional block diagrams in FIGS. 4A and 4B. The circuit includes two suitable locations for the gain adjustment stage 42. A first location 54, as shown in FIG. 4A, is located on a path 55 at the output of a left operational amplifier (opamp) 58 in the voltage compensator stage (e.g., the voltage compensator stage 8) of the circuit. A second location 56, as shown in FIG. 4B, is located on the path 55 to the negative terminal of a right opamp 60 in the current compensator stage (e.g., current compensator stage 14) of the circuit. Whether placed at the first location 54 or the second location 56, the effect of the gain adjustment stage 42 is to increase the voltage seen at the negative input 57 of the right opamp 60 when more output current is desired and to decrease the voltage seen at the negative input 57 of the right opamp 60 when less output current is desired. In an example the circuit is represented as a control scheme. In another example, the voltage compensator stage and the left opamp 58 are located in a central controller (e.g., the central controller 30) of the circuit.

In both FIG. 4A and FIG. 4B, according to certain examples, the gain adjustment stage 42 receives commands from a controller of the power module 40, which receives input from the current sensing stage 19. The path 55, in both embodiments, connects the output of the left opamp 58 with the negative input 57 of the right opamp 60 through one or more path components 63. According to certain examples, the path components 63 include at least two resistors coupled in series along the path 55 between the output of the left opamp 58 and the negative input of the right opamp 60 as well as a capacitor coupled between the at least two resistors and the positive input of the left opamp 58. The output of the right opamp 60 is connected to the negative input 57 of the right opamp 60 via one or more feedback components 61. According to certain examples, the feedback components 61 include two or more resistors and at least one capacitor. In an example, two resistors in series connect the output of the right opamp 60 to the negative input 57, and a capacitor is coupled in parallel with the resistor closest to the negative input 57 amongst the resistors in series.

At least one embodiment includes the first location 54 being coupled between the output of the left opamp 58 and the first resistor along the path 55 included in the path components 63. At least one embodiment includes the second location 56 being coupled to a node shared by the second resistor in the path components 63 along the path 55, the negative input 57, and the node shared by the capacitor and resistor in parallel in the feedback components 61.

It is understood that the circuit described above may include additional resistors, capacitors, and other components not shown in FIGS. 4A and 4B. These components have been intentionally left out so that the location and effect of the gain adjustment stage 42 on the negative input 57 of the right opamp 60 can be better understood.

The current compensator stage may be implemented by the right opamp 60 to operate such that the sum of the net current into the node of negative input 57 of the second opamp is necessarily zero, assuming the right opamp 60 is an ideal opamp. Thus, the total current caused by the current reference signal, the sensed inverter current feedback signal, and the right opamp 60 output feedback signal should have a sum of zero.

As shown in shown in FIG. 3A and FIG. 3B, the current reference signal Cref (e.g., the current reference signal 36) is connected to the positive input of the second summer 12. In the implementation of the hysteretic current mode control circuit described above in relation to FIGS. 4A and 4B, the current reference signal Cref is connected to the negative input 57 of the right opamp 60 through a resistor network. The current feedback signal is connected to the same negative input of the right opamp 60 through resistor(s), but its polarity is negative. Accordingly, the same input of the right opamp may serve as the positive and negative input of the second summer 12 in FIG. 3A and FIG. 3B, and to implement the current compensator stage of the hysteretic current mode control circuit.

In one embodiment, the power module 40 adjusts its power level without synchronization with the central controller 46. When the power module 40 adjusts the gain of the current reference signal 36, the total output current will deviate from the original current value. This deviation causes the output voltage to deviate from the controlled target (i.e., a voltage error). The outer voltage control loop compensates for this voltage error and adjust its current reference signal 36. This adjusted currented reference signal 36 shifts the shared current level among all power modules. The system balances itself over such adjustment without affecting the output voltage regulation.

The gain adjustment stage 42, in certain embodiments, is implemented by a dual channel 8 Bit I2C digital potentiometer added to the current reference signal path or the current sensing path. Embodiments of the gain adjustment stage 42 herein are not limited to only this structure and those of ordinary skill in the art would readily understand that other gain control methods like a gain adjustable amplifier, for example, could be utilized as well.

It is understood that the control schemes and modular UPSs disclosed herein include a method of controlling such modular UPSs. The method may be embodied as program instructions on a non-transitory computer readable medium for subsequent execution by a processor or other controller to carry out the method. Examples of non-transitory computer readable media include, but are not limited to non-volatile memory, such as NAND flash memory, cloud-based storage solutions such as a server from Amazon Web Services, and solid-state drives (SSD). Example of processors include AMD Ryzen CPUs and Intel Core CPUs.

The embodiments described herein provide solutions for adding control over individual power module current outputs. Examples include a gain adjustment stage that may be provided either to adjust the gain of the current reference signal or to adjust the sensed current feedback signal fed into a hysteresis comparator. Other examples include a gain adjustment stage using a resistor divider or a single bit digitally controlled resistor divider. The resistor divider may be controlled with an analog switch to provide gain adjustment, or for more refined control, a duty cycle control can be applied to the single bit digitally controlled resistor divider, thereby instead of applying on or off all the time, the bit can be controlled to be on at a certain duty cycle. Power sharing can thus be averaged over time to avoid overheating resulting from uneven power sharing. Thus, when the controlled gain is applied only part of the time based on the controlled duty cycle, an average gain can be achieved, which results in adjustable power sharing of more than two levels, even with a single digital control line.

Additionally, such gain control can be applied near the zero crossing of the output current to reduce any potential disturbance. The gain control can be implemented such that certain numbers of line cycles are for higher gain, and a second number of line cycles are of lower gain. Thus, average gain can be achieved according to the number of cycles of high or low gain.

The new control schemes disclosed herein go beyond the power sharing problem. With traditional control, the power module has no control over its power level except for shutting down. With improvements described herein, the power module can operate at a power level customized to its needs and different power modules are easily operated to have different power levels from each other. This makes it possible to operate most power modules at the best efficiency as well as to share the power level according to the battery level of each power module for certain topologies. Additionally, these improvements open the possibility to optimize the parallel power control with added intelligence.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
   a first input configured to receive AC power from an AC power source;
   a second input configured to receive backup power from a backup power source;
   an output configured to provide AC output power to a load; and
   a plurality of power modules coupled in parallel between the first input and the output, each power module of the plurality of power modules configured to provide at least a portion of the AC output power to the output, and each power module of the plurality of power modules comprising:
      a current compensator stage configured to generate a current error signal based on output current of a corresponding power module; and
      a gain adjustment stage configured to:
         receive a current reference signal and adjust a gain of the received current reference signal based on a measurement of the output current and a desired output current of the corresponding power module to generate a gain-adjusted current reference signal, and
         adjust the current error signal based on the measurement of the output current and a desired output current of the corresponding power module by providing the gain-adjusted current reference signal to an input of the current compensator stage of at least one of the plurality of power modules.

2. The uninterruptible power supply of claim 1, wherein in adjusting the current error signal the gain adjustment stage is further configured to:
   increase the current error signal in the corresponding power module to increase the output current of the corresponding power module.

3. The uninterruptible power supply of claim 1, wherein in adjusting the current error signal the gain adjustment stage is further configured to:
   decrease the current error signal in the corresponding power module to decrease the output current of the corresponding power module.

4. The uninterruptible power supply of claim 1, wherein the current compensator stage of the at least one of the plurality of power modules includes an operational amplifier, and the input of the current compensator stage of the at least one of the plurality of power modules has a negative input of the operational amplifier, the negative input configured to receive the gain adjusted current reference signal.

5. The uninterruptible power supply of claim 1, further comprising a central control module configured to generate the current reference signal based on an output voltage at the output and provide the current reference signal to the current compensator stage.

6. The uninterruptible power supply of claim 5, further comprising at least one outer voltage control loop including the central control module and a signal path between the central control module, the gain adjustment stage, the current compensator stage, and the output.

7. The uninterruptible power supply of claim 1, wherein the gain adjustment stage is further configured to adjust a gain of a negative feedback signal to generate a gain adjusted negative feedback signal.

8. The uninterruptible power supply of claim 7, wherein the current compensator stage of the at least one of the plurality of power modules includes an operational amplifier, and the input of the current compensator stage of the at least one of the plurality of power modules has a negative input of the operational amplifier, the negative input of the operational amplifier configured to receive the gain adjusted feedback signal through a resistor.

9. The uninterruptible power supply of claim 8, further comprising a central control module configured to generate a current reference signal based on an output voltage at the output and provide the current reference signal to the negative input of the operational amplifier through the resistor.

10. The uninterruptible power supply of claim 1, wherein the gain adjustment stage comprises a resistor divider.

11. The uninterruptible power supply of claim 10, wherein the resistor divider is a single bit digitally controlled divider.

12. The uninterruptible power supply of claim 11, wherein the gain adjustment stage of the at least one of the plurality of power modules is further configured to provide a pulse width modulation control signal to the single bit digitally controlled resistor divider.

13. The uninterruptible power supply of claim 12, wherein the gain adjustment stage is further configured to adjust a duty cycle of the pulse width modulation control signal to achieve a desired average gain of the gain adjustment stage.

14. The uninterruptible power supply of claim 1, wherein each power module of the plurality of power modules further comprises:
a sensor configured to monitor output current of the corresponding power module and provide a feedback signal based on the monitored output current to the gain adjustment stage, the feedback signal having the opposite polarity to a current reference signal.

15. The uninterruptible power supply of claim 1 wherein the gain adjustment stage is configured to receive a command from a microcontroller in the corresponding power module, the command based on the measurement of the output current and the desired output current of the corresponding power module.

16. The uninterruptible power supply of claim 1 wherein the output current of the corresponding power module is output current of an inverter in the corresponding power module, the corresponding power module including a current sensor configured to sense the output current from the inverter.

17. A power module configured to be coupled to one or more additional power modules in parallel, the power module comprising:
an input configured to receive AC power from an AC power source;
an output configured to provide AC output power to a load;
a current compensator stage configured to generate a current error signal based on output current of the power module; and
a gain adjustment stage configured to:
receive a current reference signal and adjust a gain of the received current reference signal based on a measurement of the output current and a desired output current of the corresponding power module to generate a gain-adjusted current reference signal, the gain-adjusted current reference signal being an adjusted signal, and
adjust the current error signal based on a measurement of the output current and a desired output current of the power module by providing the gain-adjusted current reference signal to an input of the current compensator stage of at least one of the plurality of power modules.

18. A non-transitory computer readable medium storing instructions for operating at least one power module of a plurality of power modules coupled in parallel, the instructions when executed cause the at least one power module to perform the acts comprising:
receiving AC power from an AC power source at an input;
providing AC output power to a load at an output;
generating a current error signal by a current compensator stage based on output current of the at least one power module;
receiving a measurement of output current of the at least one power module;
receiving a current reference signal and adjust a gain of the received current reference signal based on the measurement of the output current and a desired output current of the corresponding power module to generate a gain-adjusted current reference signal, the gain-adjusted current reference signal being an adjusted signal; and
adjusting the current error signal of the corresponding power module, based on the received measurement and a desired output current of the at least one power module, by providing the gain-adjusted current reference signal to an input of the current compensator stage of the at least one power module.

* * * * *